United States Patent [19]

Volz

[11] Patent Number: 5,385,395
[45] Date of Patent: Jan. 31, 1995

[54] SLIP-CONTROLLED BRAKE SYSTEM, ESPECIALLY FOR AUTOMOTIVE VEHICLES

[75] Inventor: Peter Volz, Darmstadt, Germany
[73] Assignee: Alfred Teves GmbH, Germany
[21] Appl. No.: 198,199
[22] Filed: Feb. 17, 1994

Related U.S. Application Data

[63] Continuation of Ser. No. 952,892, Nov. 20, 1992, abandoned.

[30] Foreign Application Priority Data

Mar. 22, 1991 [DE] Germany ............... 4109450

[51] Int. Cl.[6] ............... B60T 8/32; B60T 8/36; B60T 8/48; F15B 20/00
[52] U.S. Cl. ............... 303/116.1; 303/111; 303/87; 303/119.1; 303/6.01
[58] Field of Search ............... 303/116.1, 6.01, 87, 303/9.62, 84.1, 84.2, 9.61, 119.1, 118.1, 48–49, 113.1, 117.1, 111; 188/354, 345, 204 R, 151 A, 152; 138/30, 31, 26; 417/540; 181/272, 209, 233, 207

[56] References Cited

U.S. PATENT DOCUMENTS

| | | |
|---|---|---|
| Re. 25,211 | 7/1962 | Fellberg . |
| 3,434,286 | 3/1969 | Raizes ............... 188/345 X |
| 3,520,577 | 7/1970 | Moyer ............... 303/84.2 |
| 3,640,067 | 2/1972 | Ingram ............... 188/345 X |
| 4,188,073 | 2/1980 | Ishikawa et al. ............... 303/87 |
| 4,482,192 | 11/1984 | Leiber ............... 303/119.1 |
| 4,703,978 | 11/1987 | Belart et al. ............... 188/345 X |
| 4,743,076 | 5/1988 | Davis et al. ............... 303/111 X |
| 4,759,387 | 7/1988 | Arendt . |
| 4,852,952 | 8/1989 | Kervagoret ............... 303/84.2 X |
| 4,886,321 | 12/1989 | LaBroise et al. ............... 303/111 X |
| 4,989,924 | 2/1991 | Toda et al. . |
| 5,007,687 | 4/1991 | Kircher et al. ............... 303/900 X |
| 5,169,213 | 12/1992 | Matsuda et al. ............... 303/119.1 |
| 5,209,554 | 5/1993 | Beilfuss et al. ............... 303/116.1 |
| 5,211,454 | 5/1993 | Schaefer et al. ............... 303/113.2 |

FOREIGN PATENT DOCUMENTS

| | | |
|---|---|---|
| 2643860 | 3/1978 | Germany . |
| 3631128 | 4/1987 | Germany . |
| 3631507 | 3/1988 | Germany . |
| 3814436 | 1/1989 | Germany . |
| 3808901 | 10/1989 | Germany . |
| 3915781 | 11/1989 | Germany . |
| 3836112 | 4/1990 | Germany . |
| 3841366 | 6/1990 | Germany . |
| 3842370 | 6/1990 | Germany . |
| 3842699 | 6/1990 | Germany . |
| 3843570 | 6/1990 | Germany . |
| 3904132 | 8/1990 | Germany . |
| 9003635 | 8/1990 | Germany . |
| 3913352 | 10/1990 | Germany . |
| 3914953 | 11/1990 | Germany . |
| 3922081 | 1/1991 | Germany . |
| 3924085 | 1/1991 | Germany . |
| 60-248467 | 12/1985 | Japan . |
| 2102858 | 4/1990 | Japan . |
| WO8603263 | 6/1986 | WIPO . |
| WO9012713 | 11/1990 | WIPO . |

OTHER PUBLICATIONS

Mehr Sicherheit beim Bremsen. In: fluid, Ausg. Oct. 1979, S.40 u.42.

*Primary Examiner*—Douglas C. Butler
*Attorney, Agent, or Firm*—Robert P. Seitter; J. Gordon Lewis

[57] ABSTRACT

The invention is concerned with a slip-controlled brake system, adapted for use in automotive vehicles, provided with a master cylinder connected to wheel brakes through main pressure conduits. The brake system is made up of hydraulic auxiliary pressure pumps, wheel sensors and electronic circuits for determining the wheel rotation pattern and for generating electrical brake pressure control signals which control electromagnetically actuable pressure fluid inlet and outlet valves provided in the pressure fluid conduits for slip control purposes. At least one volume-displacing pressure pulsation snubber cooperating with the pressure column of the two main pressure conduits is being disposed between the wheel brakes and the appertaining inlet valves of two main pressure conduits. The pressure pulsation snubber, converts the sonic energy generated in response to the valve switching frequencies in the fluid medium to kinetic energy and/or reflects the sonic energy on boundary faces of the pressure pulsation snubber, thereby minimizing the valve switching noises without affecting the pedal characteristic.

16 Claims, 3 Drawing Sheets

SLIP-CONTROLLED BRAKE SYSTEM, ESPECIALLY FOR AUTOMOTIVE VEHICLES

This is a continuation of application Ser. No. 07/952,892 filed on Nov. 20, 1992, now abandoned.

BACKGROUND OF THE INVENTION

The invention relates to a slip-controlled brake system and more particularly to a slip-controlled brake system for use with automotive vehicles.

International Patent Application PCT/EP/00266 teaches the provision of pressure pulsation snubbers within the main pressure conduits in the vicinity of the brake pressure generator or in shunt with the electromagnetic inlet and outlet valves. The pressure pulsation snubbers as employed are configured as vibration-damping elastomeric energy storing elements which, through their defined volume expansion, flow length and restricting properties, are intended to prevent transmission of sonic emissions resulting from pump and valve switching frequencies, to the mass-loaded and, consequently, vibratory brake system.

A relatively soft pedal-"feel" and the enlargement of the pedal travel are undesired consequences of the volumetric absorption of pressure fluid during the braking process which is additionally caused by the afore-described pressure pulsation snubbers.

SUMMARY OF THE INVENTION

It is, therefore, the object of the invention, to provide a brake system which efficiently reduces the noise level generated by the-valve switching positions, and the propagation of these sound emissions without involving the afore-described pedal characteristic during the pressure modulation while maintaining an unchanged basic build-up of the brake system.

This problem, in the practice of the invention, is solved by disposing volume displacing pressure pulsation snubbers between the wheel appertaining inlet valves of the two main pressure conduits. Hence, the invention is based on the principle of reflecting the pressure pulses of varying intensity released by the switching frequencies of the valves within a volume-displacing pulsation snubber. The pressure pulsation snubber functions as a resonator (channel and chamber) and is provided in the form of a branching filter relative to the direction of pressure fluid flow. The sound attenuation is, substantially, by pulse reflection on the cross-sectional changes between channel and chamber, and by sound storage and sound suppression in the chamber.

According to an embodiment of the principle of the invention a diaphragm is provided in the main pressure conduit between the hydraulic connection of the pressure pulsation snubber and the wheel brake to attain a pressure-responsive influence on the flow for operating the pressure pulsation snubber.

The check valve in connection with the desired functional properties of the brake system, performs an important safety feature. The check valve, after completion of the braking process performed on the pedal side, enables the quick unrestricted pressure decrease in the respective wheel brake.

A particularly advantageous embodiment of the reflection attenuator is provided by a pressure pulsation snubber which includes a piston sealingly guided within the cylinder. In response to the intensity of the pressure pulses, this embodiment of the pressure pulsation snubber on the one hand limits additional volume absorption (vibration-damping flexibility of the brake system) and, on the other hand, confines a reflection chamber.

Another advantageous structural embodiment of the pressure pulsation snubber includes two pistons series-arranged within a cylinder. The hydraulic pressure respectively prevailing in the main pressure conduits can be applied to the piston front faces of the two pistons facing away from one another, whereas the piston front faces of the two pistons facing one another form a compression chamber.

Alternatively, a particularly small-sized, low-cost embodiment of the pressure pulsation snubber is formed only of a diaphragm clamped within a housing to which the pressures from two wheel brakes can be applied from either side.

Further features, advantages and applications will become manifest from the following description of a variety of embodiments.

DETAILED DESCRIPTION OF THE PREFERRED EMBODIMENT

Figure 1:
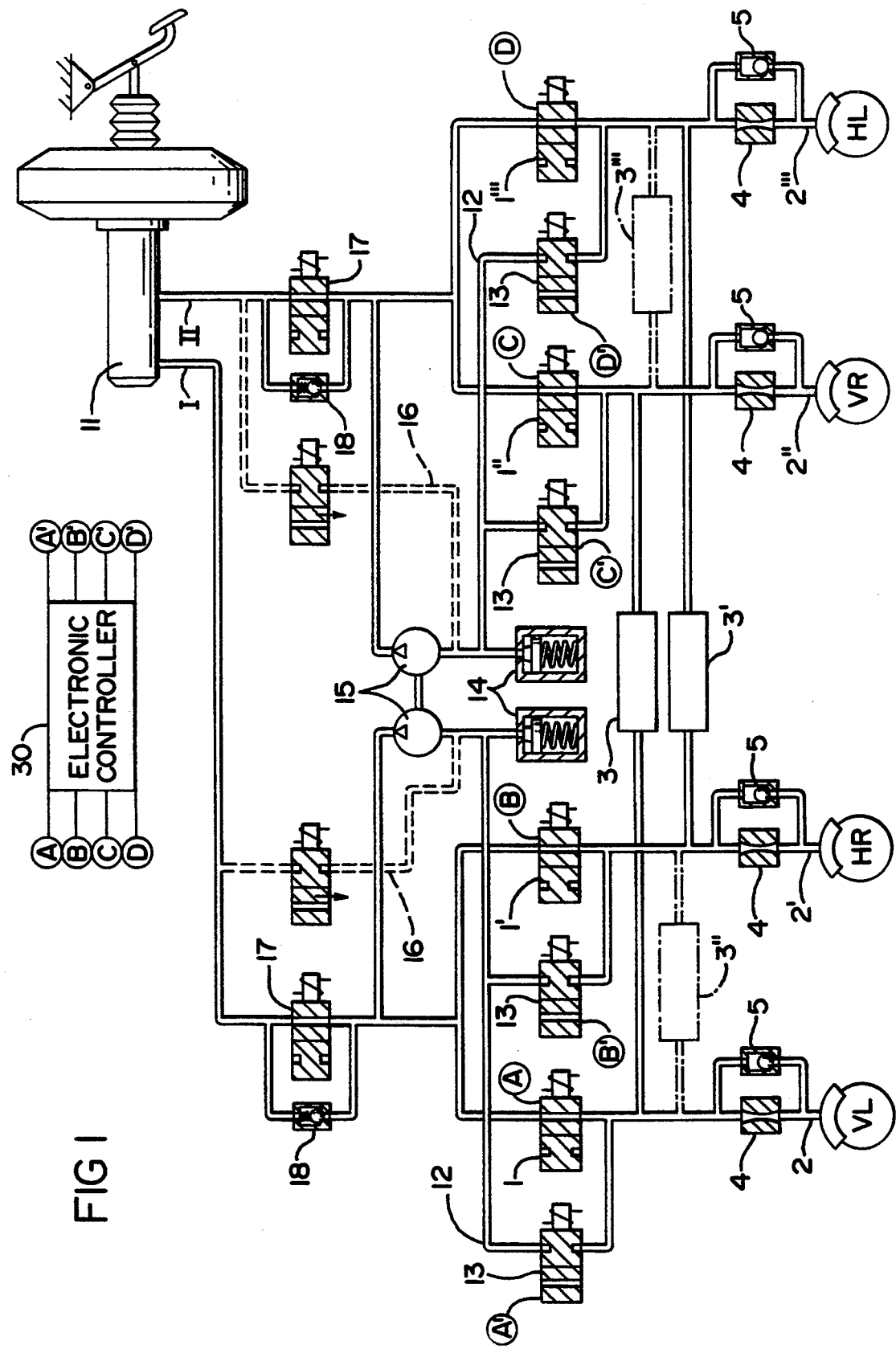
FIG. 1 is a schematic view of a first embodiment for the provision of pressure pulsation snubbers for slip-controlled diagonal dual-circuit brake systems adapted for traction slip control in automotive vehicles with front and rear drive.

Referring to the drawings, FIG. 1 shows a hydraulic circuit configuration for a slip-controlled diagonal dual-circuit-type brake system. The hydraulic circuit, individually, comprises the two brake circuits I, II in communication with the brake pressure generator 11. Brake Circuits I and II, through the associated main pressure conduits 2,2', 2'', 2''', are diagonally divided between the individual wheel brakes VL, HR, HL, VR. Located in each of the main pressure conduits 2 to 2''' are inlet valves 1,1', 1'', 1''', open in the basic position, which can be actuated electromagnetically, hydraulically or by electromotive force such as by an electronic controller 30.

Respectively connected between the inlet valves 1 to 1''' and the wheel brakes VL, HR, HL, VR is a return conduit 12 accommodating an outlet valve 13 which, in the basic position, is blocked preferably electromagnetically such as by an electronic controller 30. Each of the return conduits 12 is in hydraulic communication with a low pressure accumulator 14 supplying excess pressure fluid respectively to the intake side of an auxiliary pressure pump 15. Each brake circuit I, II includes at least one dynamic energy supply consisting of a low pressure accumulator 14 and an auxiliary pressure pump 15, which is activated during slip control and is superposed to the pressure fluid feed-in in proportion to the pedal force. To improve the intake of the auxiliary pumps 15, a switchable branch 16 between low-pressure accumulator 14 and auxiliary pressure pump 15 will establish a direct hydraulic communication with the brake pressure generator 11. Moreover, separating ASR- valves 17 and relief valves 18 are provided in the two brake circuits for the traction slip control. The components essential for the noise reduction are located respectively downstream between the connection of the inlet valves 1, 1', 1'', 1''' or outlet valves 13, 13', 13'', 13''', respectively, and the wheel brakes. In a first preferred assembly, the pressure pulsation snubber 3 is in shunt with the main pressure conduit 2, 2'' leading to the wheel brakes VR, VL of the front axle. Similarly, FIG. 1 shows another pressure pulsation snubber 3' in the branch of the two main pressure conduits 2', 2''' leading to the wheel brakes HL, HR of the rear axle. According to an alternative advantageous arrangement of pressure pulsation snubbers as shown in FIG. 1, one pressure pulsation snubber 3'' and 3''', respectively, is disposed between the two diagonal wheel brakes VL, HR and VR, HL, respectively, and, hence, in the branch of the appertaining diagonal pressure conduit 2, 2' and 2'', 2''', respectively. Which of the suggested options of arrangement and combinations is to be employed for the described diagonally divided dual-circuit brake system, especially in a traction slip control, will be dependent on the desired level of noise insulation and the position of the actuated axle (front or rear drive).

Figure 2:
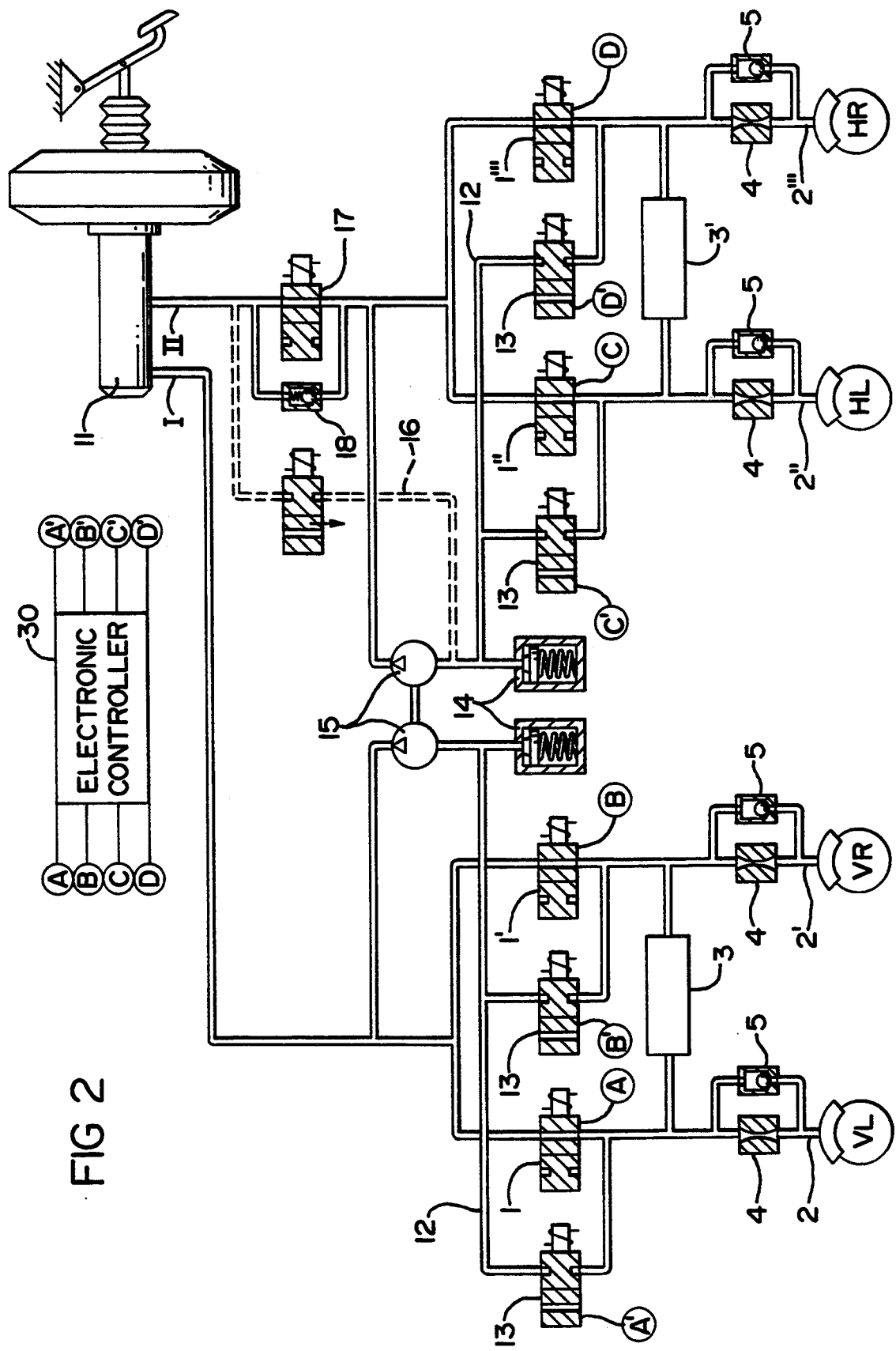
FIG. 2 is a schematic view of a second embodiment for the provision of pressure pulsation snubbers for slip-controlled brake systems with a rear axle/front axle brake circuit division adapted for traction slip control in front or rear drive.

In contrast to the diagonally divided dual brake circuit configuration shown in FIG. 1, FIG. 2 shows a dual circuit brake system with a rear axle and front axle brake circuit division so that on the first brake circuit I, the wheel brakes VL, VR of the front axle, and on the second brake circuit II, the wheel brakes HL, HR of the rear axle are in communication with the associated main pressure conduits 2 to 2'''. Statements previously made in connection with FIG. 1 apply. It is pointed out that identical components of FIGS. 1 and 2 are provided with identical reference numerals. A first pressure pulsation snubber 3 is provided between the two main pressure conduits 2,2' leading to the front left-hand and front right-hand wheel brakes of the front axle, while a second pressure pulsation snubber 3' is located between the two main pressure conduits 2'', 2''' leading to the rear left-hand and rear right-hand wheel brakes of the rear axle. Except for the description of details pertaining to FIG. 2, the statements of FIG. 1 apply.

METHOD OF OPERATION

The selected brake circuit division is irrelevant for the principle of function and, hence, for the method of operation of the pressure pulsation snubber in the brake system or, in particular, during traction slip control. The function of the pressure pulsation snubber will, therefore, basically be described by way of example with reference to the pressure pulsation snubber 3 (diagonal brake system according to FIG. 1) disposed between the two wheel brakes VR, VL of a front wheel drive vehicle.

Once at least one of the two pairs of valves, i.e. the inlet valve and/or the outlet valve 1,13 and 1'',13, respectively, of the vehicle wheel concerned, is activated during the slip control, unsteady pressure waves of varying intensity, changing in respect to amplitude and frequency are generated. The pressure waves pass, as longitudinal sonic waves, into the area of the pressure pulsation snubber 3 acting as a branch filter, with the transfer of mechanical conservation variables (energy and pulse), on the one hand, through the nature of the boundary faces within the pressure pulsation snubber 3, will result in reflection, meaning there is no hydraulic cross-talk, whereas, on the other hand, the pressure fluid volume displacing property of the pressure pulsation snubber 3 caused by the pressure pulse will lead to a reduced sonic emission level meaning there is less chatter without involving additional volume absorption in the brake system and, hence in extended pedal travel. Maintaining the original volume absorption within the brake system results from the fact that the pressure fluid displaced, effecting an increased volume, from a modulated wheel brake into the associated main pressure conduit and, hence, into the branch leading to the pressure pulsation snubber 3, inevitably results in a reduced volume within the other main pressure conduit connected to the pressure pulsation snubber 3 so that irrespective of the amount of the pressure pulsation an equilibrium of pressure fluid in the brake system is always maintained.

Embodiments of the pressure pulsation snubber 3 are shown in FIGS. 3 to 6.

Figure 3:
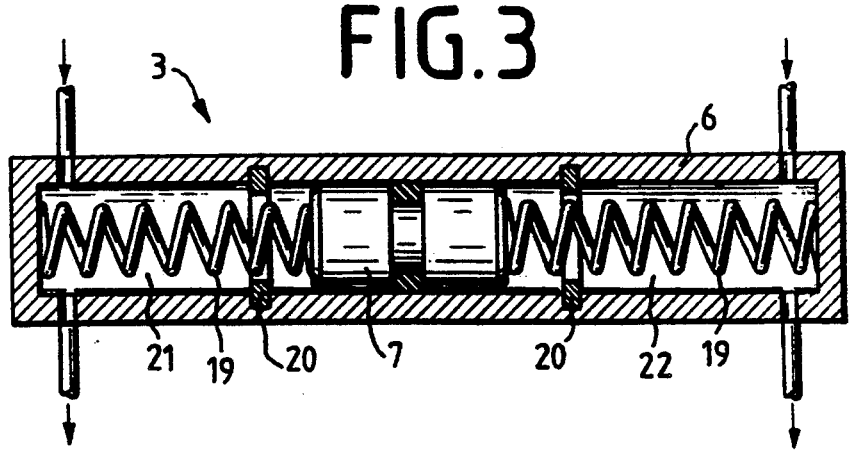
FIG. 3 is a cross-sectional view of an embodiment of the pressure pulsation snubber shown in FIGS. 1 and 2 which utilizes one piston disposed between compression springs.

FIG. 3 shows a pressure pulsation snubber 3 made up of a cylinder/piston assembly. The piston 7 is clamped between two compression springs 19 for hydraulic application to either side. For sealing the area of the cylindrical surface against leakage and, hence, for avoiding a pressure equilibrium between two main pressure conduits (such as 2,2' and 2'', 2''', respectively), the piston 7 is provided with an annular groove. In addition, stops 20 provided on either side of the piston 7 within the cylinder, confine the maximum stroke. The two pressure chambers 21, 22 confined by the cylinder 6 and piston 7 are respectively traversed by the main pressure conduit associated with a wheel brake so that pressure waves of varying intensity within the pressure chamber can propagate, reflect and unload through the displacement of the piston 7 such that a volume increase initiated in the first pressure chamber 21, simultaneously results in a volume decrease in the second pressure chamber 22 to keep the pressure fluid volume of the brake system constant.

Figure 4:
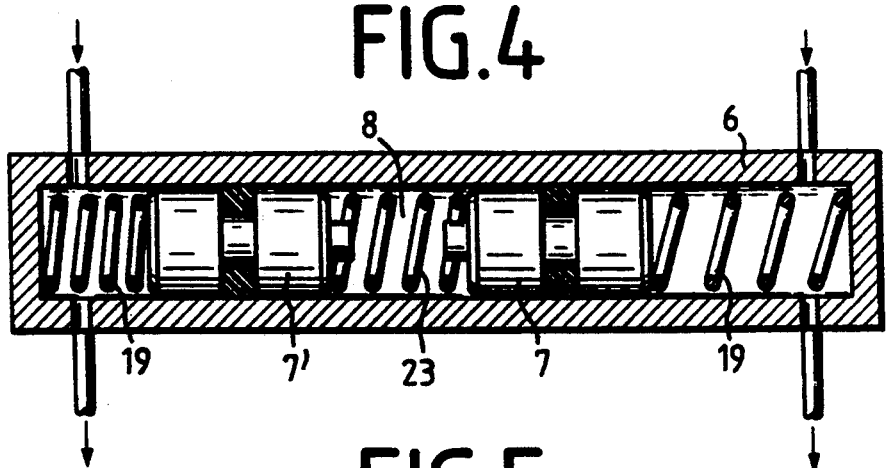
FIG. 4 is a cross-section of an alternative embodiment of the pressure pulsation snubber which utilizes two pistons in tandem confining a third compression spring.

FIG. 4 shows another advantageous embodiment of the pressure pulsation snubber in which pressure is applied by compression springs 19 to either side of tandem pistons 7,7'. A compression spring 23 clamped between the two pistons 7,7', in accordance with its spring characteristic and functioning as a spring pressure accumulator, determines the feedback of the controlled hydraulic wheel brake pressure on the brake conduit system connected to the pressure pulsating snubber 3.

Figure 5:
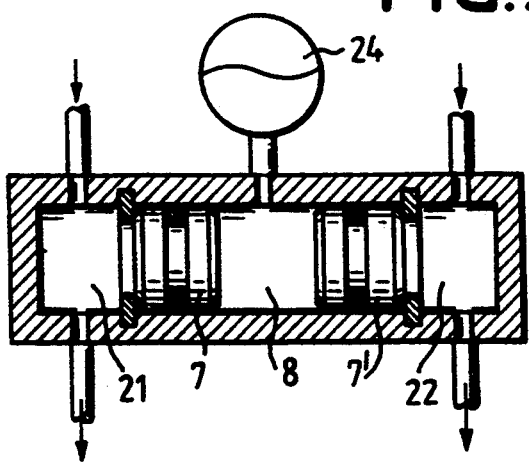
FIG. 5 is a cross-sectional view of a further alternative embodiment of the pressure pulsation snubber which utilizes a gas accumulator disposed between two pistons.

FIG. 5 shows the use of a gas pressure accumulator 24 in communication with the brake system in lieu of a spring pressure accumulator to damp the pressure pulsation introduced into a first or second pressure chamber 21, 22, thereby eliminating the provision of a compression spring between the two pistons 7,7'.

Figure 6:
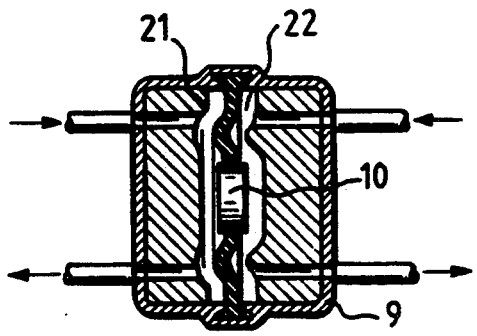
FIG. 6 is a cross-sectional view of a still further alternative embodiment of the pressure pulsation snubber which utilizes a diaphragm disposed between two pressure chambers.

A particularly compact and low-cost configuration of the pressure pulsation snubber is shown in FIG. 6. The pressure pulsation snubber is made up of a housing 9 which, through a diaphragm 10, is subdivided into two pressure chambers 21, 22 through which passes respectively one main pressure conduit 2, 2' and 2", 2''', respectively.

What is claimed is:

1. A slip-controlled brake system comprising:

a pedal actuated brake pressure generator;

a brake circuit connecting the pressure generator to a plurality of vehicle wheel brakes, each of the wheel brakes being separately controlled through appertaining pressure conduits;

a wheel sensor at each of first and second vehicle wheels and electronically coupled to an electronic circuit for both detecting wheel rotating patterns and generating electrical brake pressure control signals;

an hydraulic auxiliary pressure pump disposed in the brake circuit and supplementing the pressure generator in response to signals from the electronic circuit;

a separately controlled electromagnetic inlet valve disposed in each of the pressure conduits appertaining to first and second wheel brakes associated with the first and second wheels, a first pressure conduit and a first inlet valve associated with the first wheel and a second pressure conduit and a second inlet valve associated with the second wheel, the first and second inlet valves operatively responsive to signals from the electronic circuit;

a return conduit connected to each of the first and second pressure conduits, a first return conduit fluidly connected to the first pressure conduit between the first inlet valve and the first brake and a second return conduit fluidly connected to the second pressure conduit between the second inlet valve and the second brake;

a separately controlled electromagnetic outlet valve disposed in each of the first and second return conduit conduits, a first outlet valve disposed in the first return conduit and a second outlet valve disposed in the second return conduit, the first and second outlet valves operatively responsive to the signals from the electronic circuit, the first and second pressure conduits being controlled separately from one another such that pressure within each of the first and second pressure conduits is generally independently varied to maximize braking effectiveness; and a volume displacing pressure duration snubber having a first chamber and a second chamber separated by a resilient member and with the first chamber connected to the first pressure conduit between the first wheel brake and the first inlet valve and with the second chamber connected to the second pressure conduit between the second wheel brake and the second inlet valve, the snubber used to reduce brake chatter during an antilock braking operation without hydraulic cross-talk between the first and second pressure circuits.

2. A slip-controlled brake system as claimed in claim 1, wherein the resilient member of the volume displacing pressure snubber comprises:

a piston sealingly guided in a cylinder; and at least two opposing compression springs flanking the piston.

3. A slip-controlled brake system as claimed in claim 1, wherein the resilient member of the volume displacing pressure snubber comprises:

first and second pistons sealingly guided in a cylinder;

a first spring disposed between the first piston and a first end of the cylinder;

a second spring disposed between the second piston and a second end of the cylinder;

a third spring disposed between the first and the second pistons.

4. A slip-controlled brake system as claimed in claim 1, wherein the resilient member of the volume displacing pressure snubber comprises:

first and second pistons sealingly guided in a cylinder; and a gas accumulator disposed between the two pistons.

5. A slip-controlled brake system as claimed in claim 1, wherein the resilient member of the volume displacing pressure snubber comprises a diaphragm disposed in a housing.

6. A slip-controlled brake system as claimed in claim 1 further comprising a restriction member disposed in each of the first and second pressure conduits between a point of connection of the volume displacing pressure snubber and a corresponding one of the first and second wheel brakes, and a check valve disposed in parallel with the restriction member between the corresponding one of the first and second wheel brakes and a corresponding one of the first and second inlet valves.

7. A slip-controlled brake system for a vehicle comprising:

a pedal actuated brake pressure generator;

first and second brake circuits with each circuit connecting the pressure generator with two vehicle wheel brakes through appertaining pressure conduits;

a wheel sensor at each vehicle wheel electronically coupled to an electronic circuit for detecting wheel rotating patterns and for generating electrical brake pressure control signals;

an hydraulic auxiliary pressure pump disposed in the brake circuit and supplementing the pressure generator in response to signals from the electronic circuit;

a separately controlled electromagnetic inlet valve disposed in each of the pressure conduits appertaining to each wheel brake and operatively responsive to the signals from the electronic circuit, a first inlet valve associated with a first pressure conduit and a second inlet valve associated with a second pressure conduit;

a return conduit connected to each of the pressure conduits, a first return conduit disposed between the first inlet valve and a first of the wheel brakes and a second return conduit disposed between the second inlet valve and a second of the wheel brakes;

a separately controlled electromagnetic outlet valve disposed in each of the return conduits, a first outlet valve disposed in the first return conduit and a second outlet valve disposed in the second return conduit, the first and second outlet valves operatively responsive to the signals from the electronic circuit; and a first volume displacing pressure duration snubber having a first chamber of the first snubber and a second chamber of the first snubber separated by a resilient member of the first snubber and with the first chamber of the first snubber connected to the first pressure conduit at a point between the first wheel brake and the first return conduit and with the second chamber of the first snubber connected to the second pressure conduit at a point between the second wheel brake and the second return conduit, the snubber used to reduce brake chatter during an antilock braking operation without hydraulic cross-talk between the first and second brake circuits.

8. A slip-controlled brake system as claimed in claim 7 further comprising:
a second volume displacing pressure duration snubber
first chamber of the second snubber and a second chamber Of the second snubber separated by a resilient member of the second snubber and with the first chamber of the second snubber connected to a third of the pressure conduits at a point between a third of the wheel brakes and a third return conduit and with the second chamber of the second snubber connected to a fourth of the pressure conduits at a point between a fourth of the wheel brakes and a fourth return conduit.

9. A slip-controlled brake system as claimed in claim 5, wherein:
the first and third wheel brakes are diagonally opposed and the second and fourth wheel brakes are diagonally opposed in the vehicle;
the first and third wheel brakes are connected with one of the first and second brake circuits; and
the second and fourth wheel brakes are connected with the other of the first and second brake circuits.

10. A slip-controlled brake system as claimed in claim 8, wherein:
the first and second wheel brakes are connected to one of the first and second brake circuits and are both one of front and rear wheel brakes; and
the third and fourth wheel brakes are connected to the other of the first and second brake circuits and are both the other of the front and rear wheel brakes.

11. A slip-controlled brake system as claimed in claim 10, further comprising:
a restriction member disposed in each of the pressure conduits between a point of connection of one of the first and second volume displacing pressure snubbers and a corresponding one of the wheel brakes; and
a check valve disposed in parallel to the restriction member between the one of the wheel brakes and a corresponding one of the inlet valves.

12. A slip-controlled brake system as claimed in claim 11, wherein the resilient member of each of the first and second snubbers comprises:
a piston sealingly guided in a cylinder; and
at least two opposing compression springs flanking the piston.

13. A slip-controlled brake system as claimed in claim 11, wherein the resilient member of each of the first and second snubbers comprises:
first and second pistons sealingly guided in a cylinder;
a first spring disposed between the first piston and a first end of the cylinder;
a second spring disposed between the second piston and a second end of the cylinder;
a third spring disposed between the first and the second pistons.

14. A slip-controlled brake system as claimed in claim 11, wherein the resilient member of each of the first and second snubbers comprises:
first and second pistons sealingly guided in a cylinder; and
a gas accumulator disposed between the two pistons.

15. A slip-controlled brake system as claimed in claim 11, wherein the resilient member of each of the first and second snubbers comprises a diaphragm disposed in a housing.

16. A slip-controlled brake system as claimed in claim 7 further comprising:
the first pressure conduit being connected with one of the first and second brake circuits; and
the second pressure conduit being connected with the other of the first and second brake circuits.

* * * * *

UNITED STATES PATENT AND TRADEMARK OFFICE
CERTIFICATE OF CORRECTION

PATENT NO. :   5,385,395
DATED      :   January 31, 1995
INVENTOR(S) :  Volz

It is certified that error appears in the above-indentified patent and that said Letters Patent is hereby corrected as shown below:

In claim 8, line 14 of column 7, after the word "snubber", insert --having a--.

Signed and Sealed this

Twenty-third Day of May, 1995

Attest:

BRUCE LEHMAN

Attesting Officer         Commissioner of Patents and Trademarks